(12) United States Patent
Yang et al.

(10) Patent No.: US 10,009,834 B2
(45) Date of Patent: Jun. 26, 2018

(54) APPARATUS AND METHOD FOR ACCESSING ELECTRONIC DEVICE HAVING HOT SPOT FUNCTION

(71) Applicant: LG ELECTRONICS INC., Seoul (KR)

(72) Inventors: Inchang Yang, Seoul (KR); Jongmyeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 15/025,116

(22) PCT Filed: Sep. 26, 2014

(86) PCT No.: PCT/KR2014/009032
§ 371 (c)(1),
(2) Date: Mar. 25, 2016

(87) PCT Pub. No.: WO2015/046954
PCT Pub. Date: Apr. 2, 2015

(65) Prior Publication Data
US 2016/0242107 A1    Aug. 18, 2016

(30) Foreign Application Priority Data
Sep. 26, 2013   (KR) .................. 10-2013-0114670

(51) Int. Cl.
*H04W 48/16*      (2009.01)
*H04W 48/20*      (2009.01)
(Continued)

(52) U.S. Cl.
CPC ........... *H04W 48/16* (2013.01); *H04W 12/00* (2013.01); *H04W 12/08* (2013.01); *H04W 48/20* (2013.01);
(Continued)

(58) Field of Classification Search
CPC ..... H04W 48/16; H04W 48/20; H04W 12/00; H04W 12/08; H04W 76/02
See application file for complete search history.

(56) References Cited

U.S. PATENT DOCUMENTS

2006/0171388 A1* 8/2006 Ikeda ................... H04W 8/005
370/389
2009/0059865 A1* 3/2009 Zhang .................. H04W 36/02
370/331

(Continued)

FOREIGN PATENT DOCUMENTS

KR   10-2009-0113033 A   10/2009
KR   10-2011-0126359 A   11/2011
(Continued)

*Primary Examiner* — Gbemileke J Onamuti
(74) *Attorney, Agent, or Firm* — Birch, Stewart, Kolasch & Birch, LLP

(57) ABSTRACT

Disclosed are a method and apparatus for accessing an electronic device having a hot spot function. The method for accessing an electronic device having a hotspot (AP) function includes receiving a beacon signal from an electronic device having a hotspot function, searching for at least one electronic device having a hotspot function on the basis of the beacon signal, receiving an input signal selecting an electronic device to be accessed from among the at least one searched electronic device, generating identification information for requesting permission of an access from the selected electronic device, the identification information indicating specific information generated by a specific input signal and variably generated, transmitting the identification information to the selected electronic device, and receiving a response signal regarding whether an access is permitted from the selected electronic device on the basis of the identification information.

8 Claims, 9 Drawing Sheets

(51) Int. Cl.
*H04W 76/02* (2009.01)
*H04W 12/00* (2009.01)
*H04W 12/08* (2009.01)
*H04W 84/12* (2009.01)

(52) U.S. Cl.
CPC ........... *H04W 76/02* (2013.01); *H04W 76/10* (2018.02); *H04W 84/12* (2013.01)

(56) References Cited

U.S. PATENT DOCUMENTS

| | | |
|---|---|---|
| 2009/0271709 A1 | 10/2009 | Jin et al. |
| 2010/0261496 A1* | 10/2010 | Fukumoto ............. H04W 48/16 455/517 |
| 2011/0283001 A1 | 11/2011 | Jung et al. |
| 2012/0264474 A1 | 10/2012 | Joh et al. |
| 2013/0219284 A1 | 8/2013 | Kim |
| 2013/0231088 A1* | 9/2013 | Jabara ................. G06Q 10/101 455/411 |

FOREIGN PATENT DOCUMENTS

| | | |
|---|---|---|
| KR | 10-2012-0117040 A | 10/2012 |
| KR | 10-2013-0094549 A | 8/2013 |

* cited by examiner

[FIG. 1]
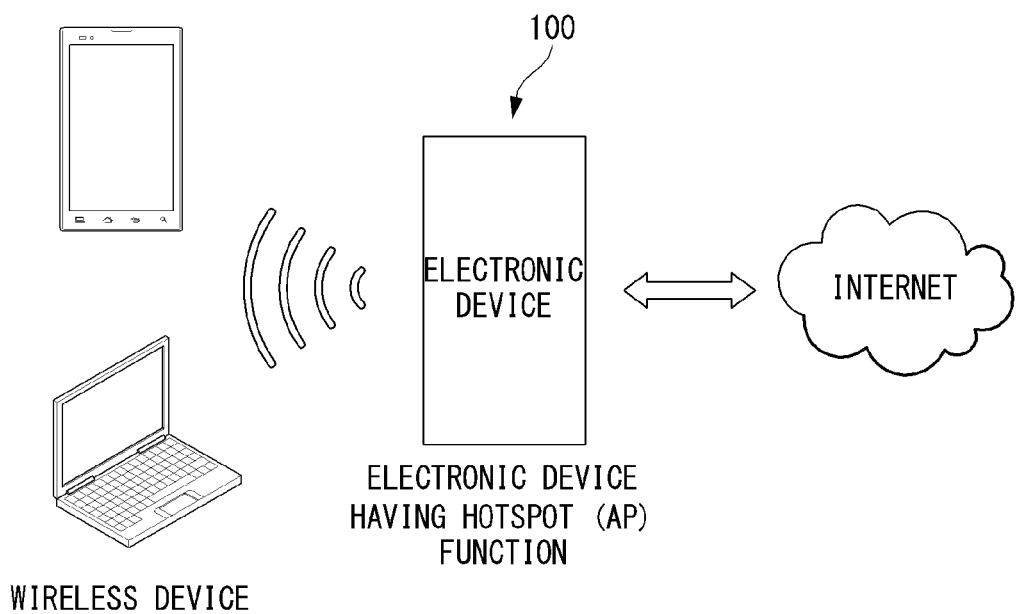

[FIG. 2]
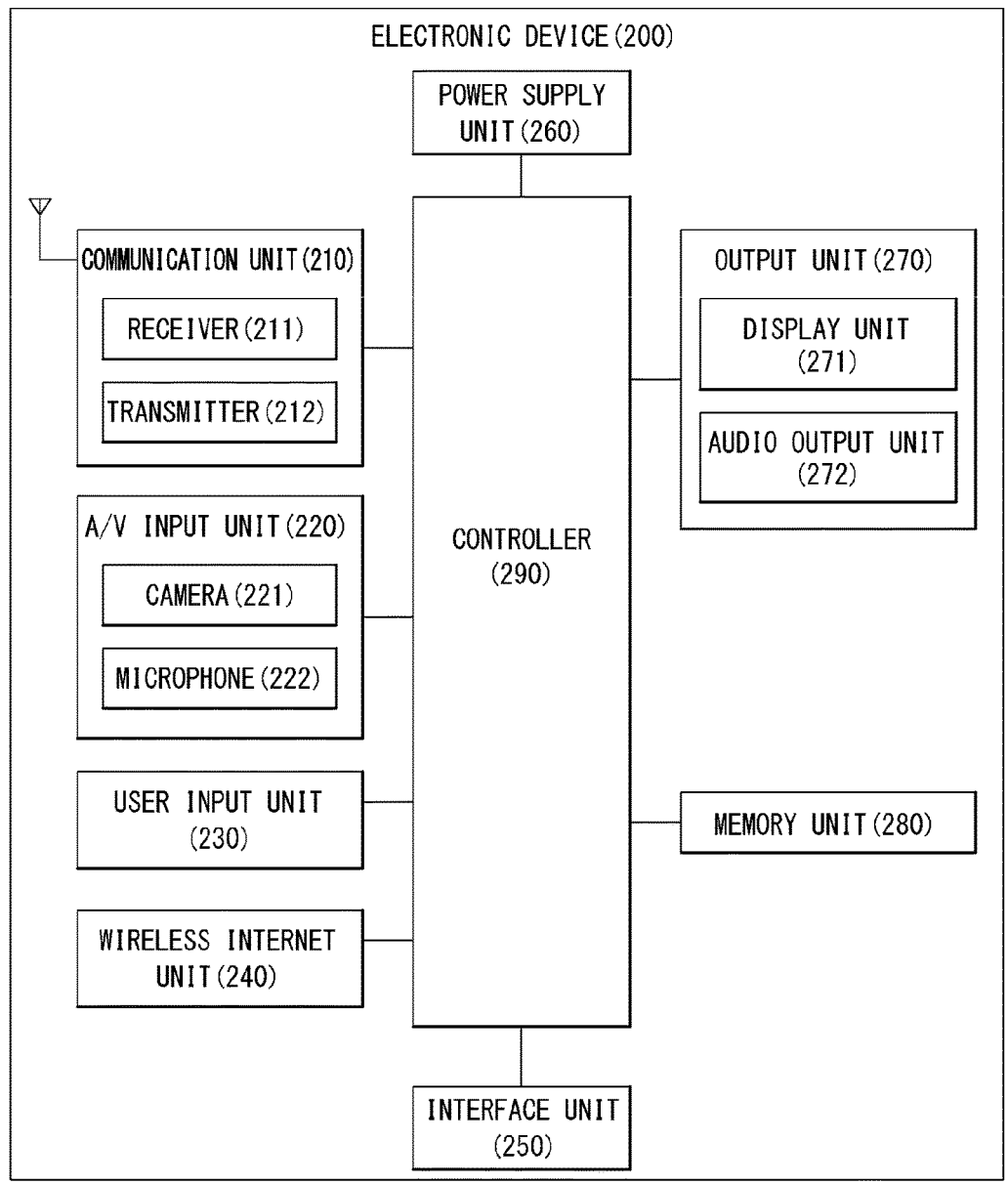

[FIG. 3]
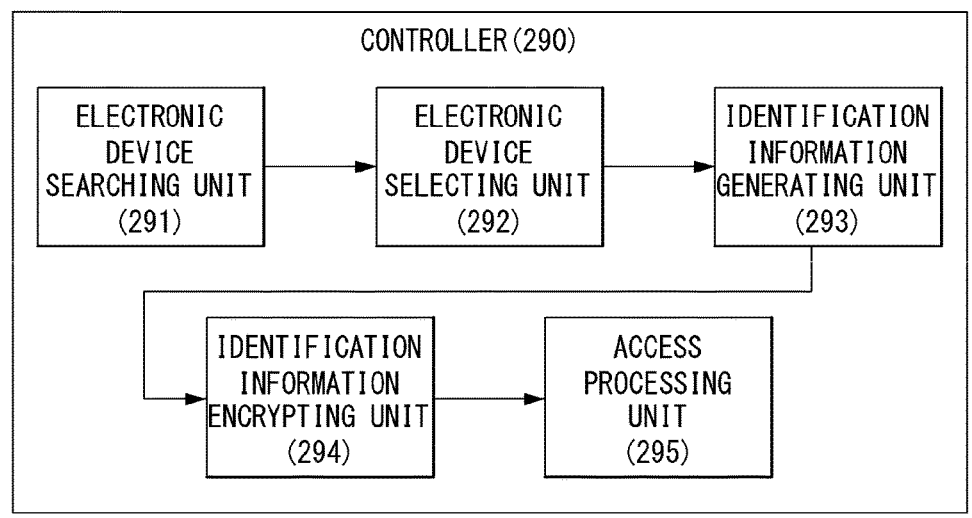

[FIG. 4]
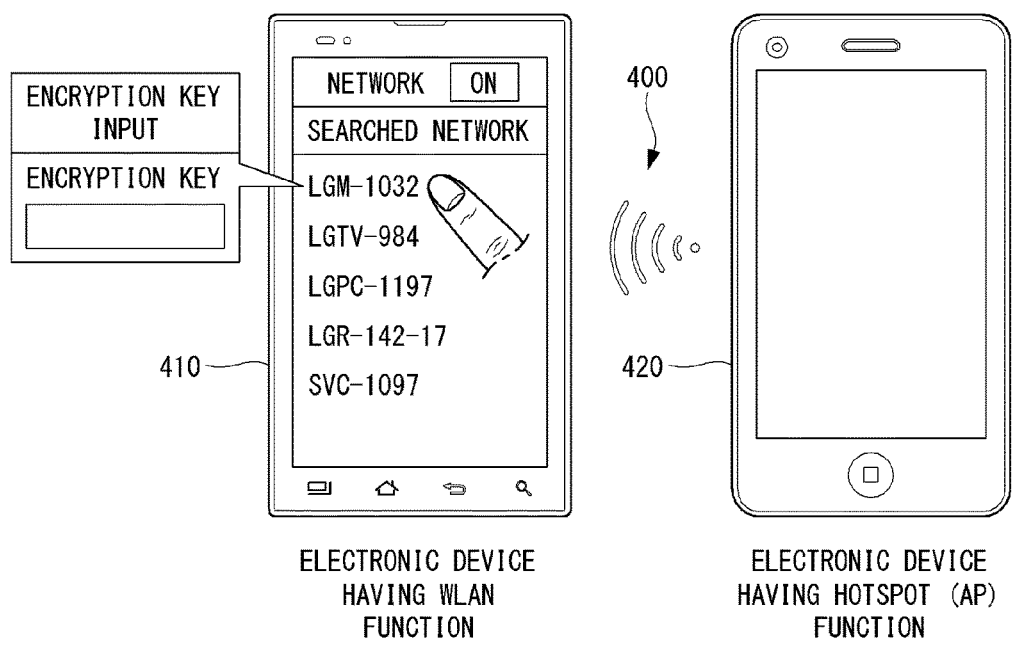

[FIG. 5]
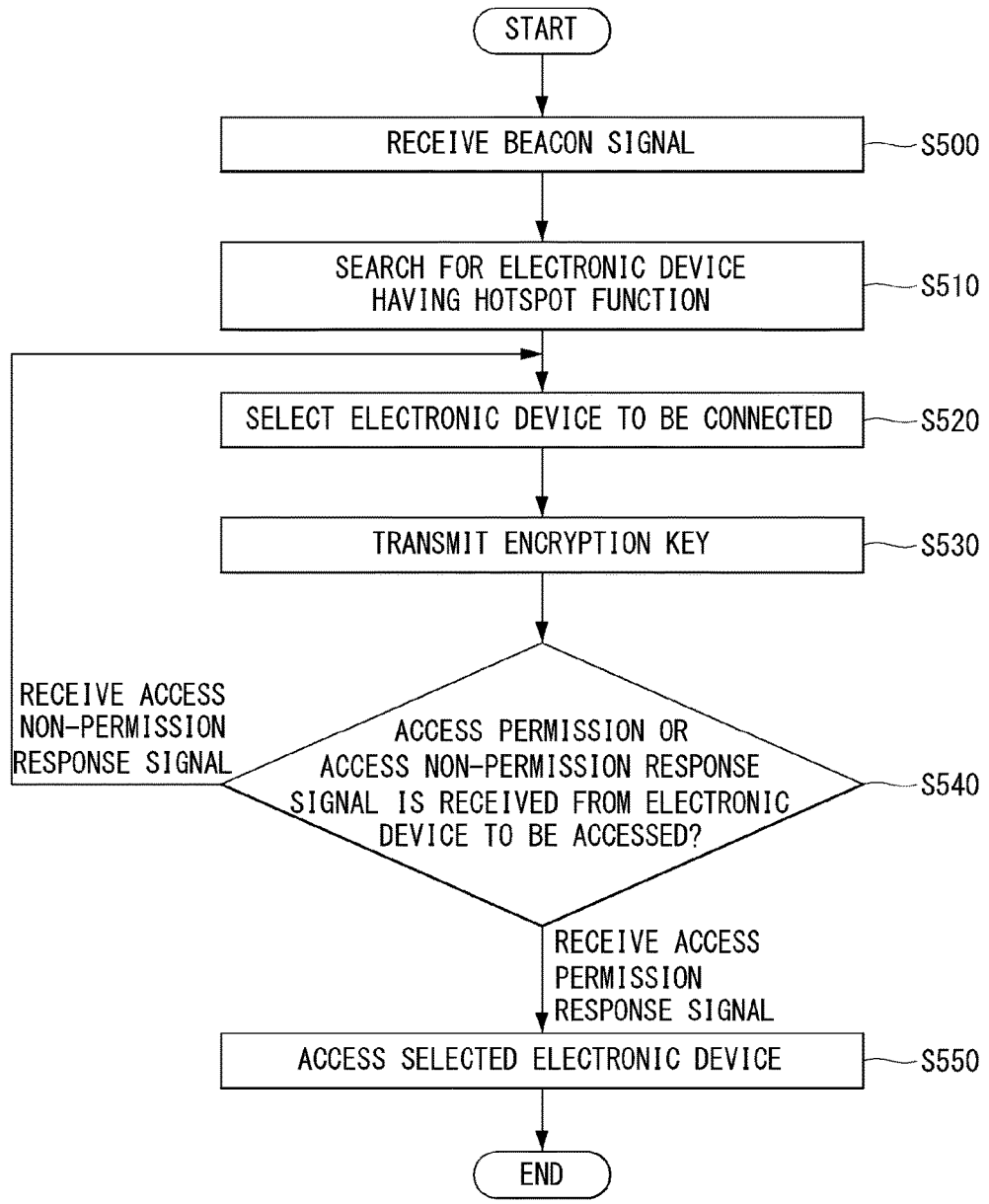

[FIG. 6]
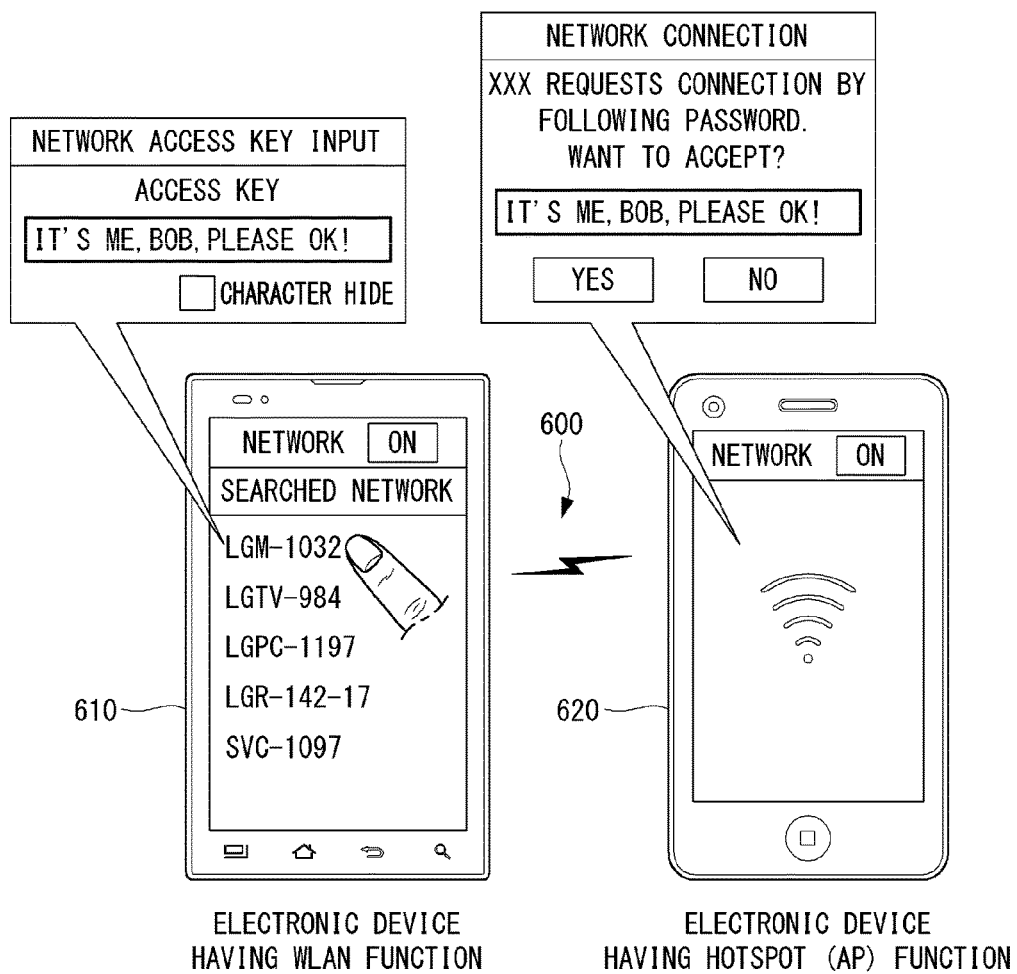

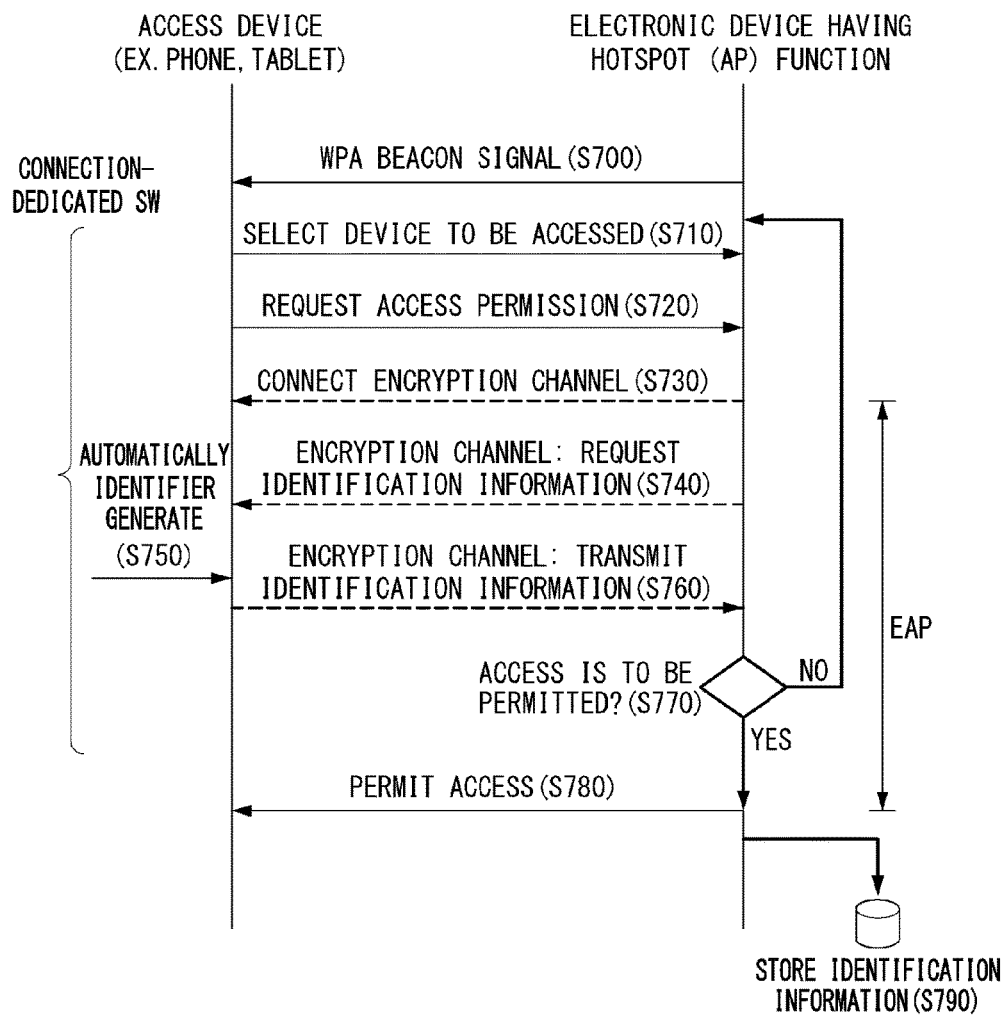
[FIG. 7]

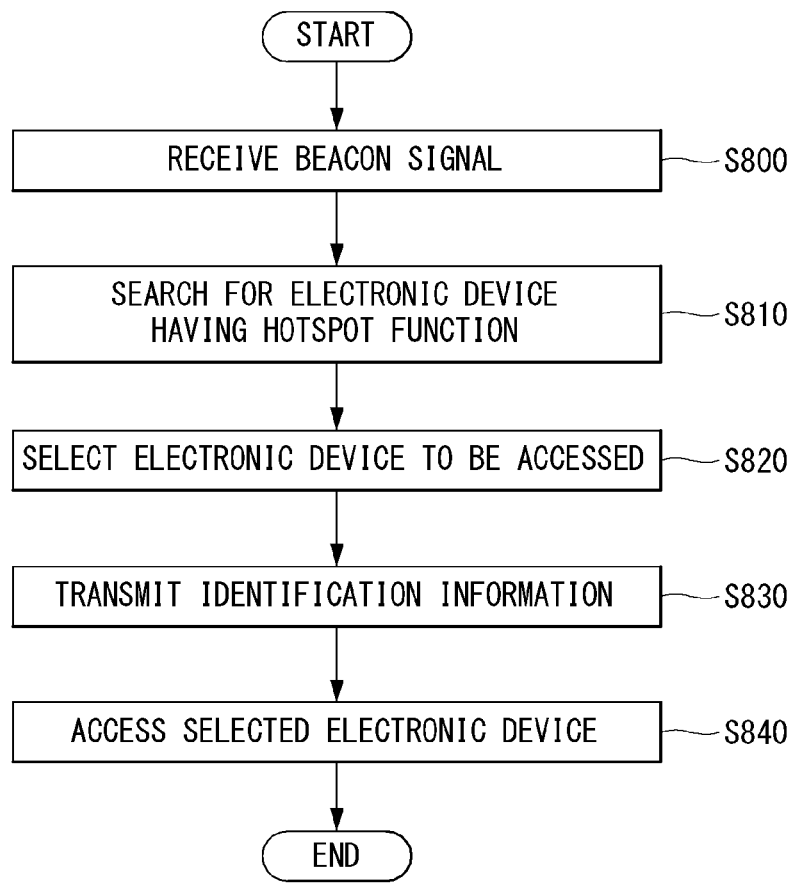
[FIG. 8]

[FIG. 9]
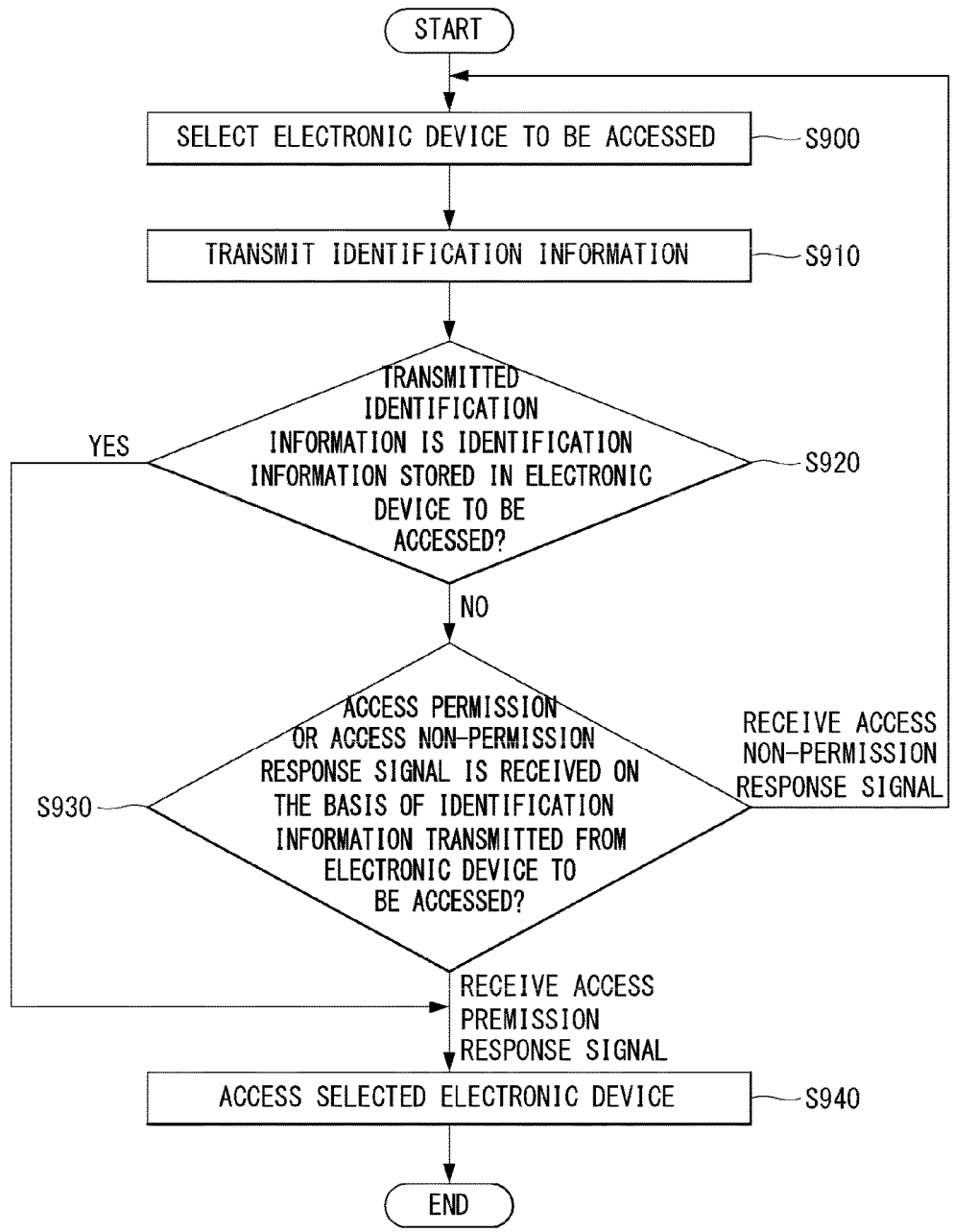

APPARATUS AND METHOD FOR ACCESSING ELECTRONIC DEVICE HAVING HOT SPOT FUNCTION

CROSS REFERENCE TO RELATED APPLICATIONS

This application is the National Phase of PCT International Application No. PCT/KR2014/009032, filed on Sep. 26, 2014, which claims priority under 35 U.S.C. 119(a) to Patent Application No. 10-2013-0114670, filed in Republic of Korea on Sep. 26, 2013, all of which are hereby expressly incorporated by reference into the present application.

TECHNICAL FIELD

The present invention relates to a method and an apparatus for accessing an electronic device having a hot spot function, and more particularly, to a method and apparatus for enabling an electronic device having a wireless local area network (WLAN) function to access an electronic device having a hot spot function to use a wireless Internet through the electronic device

BACKGROUND ART

As electronic devices having a WLAN function such as notebook computers, mobile phones, and the like, have become popularized and conveniently carried around, people are increasingly access the Internet to handle personal work in an outdoor space, as well as in offices or residential areas, or in various spaces to obtain various types of information.

In order for a user to go on Internet in such an outer space, the user should wirelessly access the Internet, and one of functions enabling the wireless Internet is a hotspot (AP) function.

A hotspot function refers to a function of causing an electronic device to be an access point ((AP) like wireless sharer to provide the Internet to an electronic device (for example, the iPad, a notebook computer, a smartphone, etc.) having a WLAN function.

In the related art, in order to access a portable terminal having a hotspot function, access permission should be obtained by inputting a preset encryption key.

With this method, however, a user should remember the encryption key all the time, and when the user cannot remember the encryption key, accessing is cumbersome or impossible. Also, when the encryption key is hacked, an unverified external device may access to cause a problem in terms of security.

DISCLOSURE

Technical Problem

Therefore, an object of the present invention is to provide a method and apparatus for accessing an electronic device having a hotspot function.

Another object of the present invention is to provide a method and apparatus for accessing an electronic device having a hotspot function by using an existing set encryption key.

Another object of the present invention is to provide a method and apparatus for receiving identification information from a user of an access device without an existing set encryption key and transmitting the received identification information to an electronic device having a hotspot function to access the electronic device.

Another object of the present invention is to provide a method and apparatus for transmitting identification information generated by connection-dedicated software to an electronic device having a hotspot function, without an existing set encryption key, to access the electronic device.

Technical subjects of the present invention are not limited to the aforementioned technical subjects and any other technical subjects not mentioned will be clearly understood by a skilled person in the art from the following description.

Technical Solution

According to an aspect of the present invention, there is provided a method for accessing an electronic device having a hotspot (AP) function, including: receiving a beacon signal from an electronic device having a hotspot function; searching for at least one electronic device having a hotspot function on the basis of the beacon signal; receiving an input signal selecting an electronic device to be accessed from among the at least one searched electronic device; generating identification information for requesting permission of an access from the selected electronic device, the identification information indicating specific information generated by a specific input signal and variably generated; transmitting the identification information to the selected electronic device; and receiving a response signal regarding whether an access is permitted from the selected electronic device on the basis of the identification information.

When the identification information is identification information stored in the electronic device, the response signal may indicate permission of an access.

When the identification information is identification information not stored in the electronic device, whether to permit an access may be determined by a user input signal of the electronic device.

The method may further include: when the response signal indicates that an access is not permitted, receiving an input signal for selecting a different electronic device to be accessed from among the at least one searched electronic device; and transmitting identification information to the different electronic device.

The method may further include: when an access is permitted by the electronic device, accessing the electronic device; and accessing the Internet through the electronic device.

When an access is permitted, the identification information which has not been stored may be stored in the electronic device.

When the electronic device is an electronic device which has been previously accessed, the identification information may not be the same as previously used identification information.

The identification information may be generated by connection-dedicated software.

The identification information may include at least any one of an identification sentence, a number, a code, and an image.

According to another aspect of the present invention, there is provided an electronic device including: a communication unit configured to receive a beacon signal for searching for at least one electronic device having a hotspot function, and transmit identification information to a selected electronic device; a display unit configured to display the at least one searched electronic device; and a controller configured to search for the at least one electronic device on the basis of the received beacon signal, select an electronic device to be accessed from among the at least one electronic device by a user input signal, and access the selected electronic device.

The electronic device may further include a user input unit configured to input the identification information.

The electronic device may further include a memory unit configured to store connection-dedicated software.

The controller may generate the identification information using the connection-dedicated software and transmit the generated identification information to access the electronic device.

The electronic device may further include a wireless Internet module configured to access the Internet through the electronic device.

Advantageous Effects

The access method and the electronic device thereof according to embodiments of the present invention have the following advantages.

According to the present invention, when a user accesses an electronic device having a hotspot function, the user may input identification information not set previously, instead of a preset encryption key, eliminating the necessity to store or set a separate encryption key.

According to the present invention, when a user accesses an electronic device having a hotspot function, whether to permit an access is determined by a user on the basis of transmitted identification information, whereby an encryption key is prevented from being hacked and an access of an external device not allowed for accessing may be prevented.

DESCRIPTION OF DRAWINGS

FIG. 1 is a view of a connection relationship for illustrating a method of accessing an electronic device having a hotspot (AP) function to use the Internet in a network to which the present invention is applied.

FIG. 2 is an internal block diagram of an electronic device performing an access method to which the present invention is applied.

FIG. 3 is a block diagram illustrating a function of a controller of an electronic device performing an access method to which the present invention is applied.

FIGS. 4 and 5 are first embodiments to which the present invention is applied, in which FIG. 4 illustrates a user interface for explaining a method for accessing an electronic device having a hotspot function to which the first embodiment is applied, and FIG. 5 is a flow chart illustrating a method for accessing an electronic device having a hotspot function to which the first embodiment is applied.

FIGS. 6 through 9 are second embodiments to which the present invention is applied, in which FIG. 6 illustrates a user interface for explaining a method for accessing an electronic device having a hotspot function to which the second embodiment is applied, FIG. 7 is a flow chart illustrating a process of accessing an electronic device having a hotspot function to which the second embodiment is applied, FIG. 8 is a flow chart illustrating a method for accessing an electronic device having a hotspot function performed by an access device to which the second embodiment is applied, and FIG. 9 is a flow chart specifically illustrating an access method according to whether identification information transmitted from an access device is previously stored identification information, in a method for accessing an electronic device having a hotspot function to which the second embodiment is applied.

BEST MODES

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, an electronic device related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

An electronic device described in this disclosure may include a mobile phone, a smartphone, a notebook computer, a laptop computer, a digital broadcasting terminal, a personal digital assistant (PDA), a portable multimedia player (PMP), a navigation device, and the like.

However, it would be easily understood by a person skilled in the art that the configuration according to embodiments described in this disclosure may also be also applicable to fixed types of terminals such as digital TVs, desk top computers, and the like, except for any elements especially configured for a mobile purpose.

FIG. 1 is a view of a connection relationship for illustrating a method of accessing an electronic device having a hotspot (AP) function to use the Internet in a network to which the present invention is applied.

Referring to FIG. 1, a method of using an electronic device 100 having a hotspot (AP) function as an access point (AP) like a wireless sharer in order to provide the Internet to an electronic device having a wireless local area network (WLAN) function is simply illustrated. When an electronic device (for example, a smartphone, a notebook computer, etc.) having a WLAN function accesses the electronic device having a hotspot (AP) function, the electronic device having a hotspot (AP) function serves as a wireless sharer and establishes a wireless-fidelity (Wi-Fi) network by itself. Through the electronic device serving as a wireless sharer, the electronic device having a WLAN function may be able to use the Internet.

FIG. 2 is an internal block diagram of an electronic device performing an access method to which the present invention is applied.

An electronic device 200 as an access device may include a communication unit 210, an audio/video (A/V) input unit 220, a user input unit 230, a wireless Internet unit 240, an interface unit 250, a power supply unit 260, an output unit 270, a memory unit 280, and a controller 290. The components illustrated in FIG. 2 are not essential and an electronic device having greater or fewer components may also be implemented.

Hereinafter, the components will be described by turns.

The communication unit 210 may include one or more modules enabling wireless communication between the electronic device 200 and a wireless communication system or between the electronic device 200 and a network in which the electronic device 200 is positioned. For example, the communication unit 210 may include one or more modules enabling wireless communication between the electronic device 200 and a wireless communication system or between the electronic device 200 and a network in which the electronic device 200 is positioned. For example, the communication unit 210 may include a receiver 211 and a transmitter 212, for example.

The receiver 211 receives a signal transmitted from a different electronic device through a channel. Here, the signal transmitted from the different electronic device may include a signal indicating that the different device has a hotspot (AP) function and signals having various data.

The transmitter 212 may transfer various types of information from the electronic device 200 to the outside, and may transmit identification information received by the electronic device 200 from a user to a different electronic device.

The A/V input unit 220 may be used to input an audio signal or a video signal, and include a camera 221 and a microphone 222. The camera 221 processes an image frame of a still image or video obtained by an image sensor in a video call mode or an image capture mode. The processed image frame may be displayed on the display unit 271 or may be transmitted to the controller 290 and converted into an identification code CODE.

The image frame processed in the camera 221 may be stored in the memory unit 280 or may be transmitted to the outside through the communication unit 210. Two or more cameras 221 may be provided according to a configuration aspect of the electronic device.

The microphone may receive an external audio signal by a microphone and processes the received audio signal into an electrical voice data in a call mode, a record mode, or a voice recognition mode. Various noise canceling algorithms for canceling noise generated in a course of receiving an external audio signal may be implemented in the microphone 222

The user input unit 230 may generate input data for the user to control an operation of the electronic device and may receive identification information for accessing the electronic device having a hotspot function from the user. The user input unit 230 can include a keypad, a dome switch, a touchpad (static pressure or static capacitance), a jog wheel, and a jog switch.

The wireless Internet unit 240 refers to a module intended for wireless Internet access. This wireless Internet unit 240 may be internally or externally coupled to the electronic device 200. Technologies for wireless Internet may include WLAN (Wireless LAN), Wi-Fi, Wireless broadband (Wibro), World Interoperability for Microwave Access (Wimax), or High Speed Downlink Packet Access (HSDPA). The wireless Internet unit 240 may access the Internet through an AP as a wireless sharer, or may access the Internet through an electronic device having a hotspot function rendering an electronic device to become an AP as a wireless sharer.

The interface unit 250 serves as a passage to all kinds of external devices connected to the electronic device 200. The interface unit 250 receives data or power from an external device and delivers the received data or power to individual elements within the electronic device or transfer internal data of the electronic device 200 to an external device. For example, the interface unit 250 may include, for example, a wired/wireless headset port, an external charger port, a wired/wireless data port, a memory card port, a port for coupling the electronic device 200 to a device having an identification module, an audio input/output (I/O) port, a video input/output (I/O) port, and an earphone port, or a USB port.

The electronic device 200 may access the Internet through a USB tethering technology using the USB port of the interface unit 250. Such a USB tethering technology refers to a function of directly connecting a smartphone and the electronic device 200 through a USB to allow the electronic device 200 to access the Internet through the smartphone.

The output unit 270, serving to generate an output related to visual or acoustic sense, includes a display unit 271 and an audio output unit 272.

The display unit 271 outputs information processed in the electronic device 200. For example, the display unit 271 may display information of an electronic device (for example, a terminal number or a terminal name) having a hotspot function searched by the electronic device 200.

The display unit 271 may include at least one of a liquid crystal display (LCD), a thin film transistor liquid crystal display (TFT LCD), an organic light-emitting diode (OLED), a flexible display, and a three-dimensional (3D) display.

Some of the displays may be configured to be transparent or light-transmissive to allow viewing of the exterior, which may be called transparent displays. A typical transparent display may be, for example, a transparent LCD, or the like. A rear structure of the display unit 271 may also have a light-transmissive structure. Through such a configuration, the user may view an object positioned at the rear side of the terminal body through the region occupied by the display unit 271 of the terminal body.

The electronic device 200 may include two or more display units 271 according to an implementation configuration. For example, a plurality of display units may be separately or integrally disposed on one surface of the electronic device 200, or may be separately disposed on different surfaces thereof.

When the display unit 271 and a sensor (referred to as a 'touch sensor', hereinafter) for detecting a touch operation are overlaid in a layered manner, the display unit 151 may function as both an input device and an output device. The touch sensor may have a form of a touch film, a touch sheet, a touch pad, and the like.

The touch sensor may be configured to convert pressure applied to a particular portion of the display unit 271 or a change in the capacitance or the like generated at a particular portion of the display unit 271 into an electrical input signal. The touch sensor may be configured to detect even pressure when a touch is applied, as well as a touched position and area.

When a touch input is applied to the touch sensor, a corresponding signal (signals) are transmitted to a touch controller. The touch controller processes the signals and transmits corresponding data to the controller 290. Accordingly, the controller 290 may recognize which portion of the display unit 271 has been touched.

The audio output unit 272 may output as audio data received from the wireless communication unit 210 or stored in the memory unit 280 in a call signal reception mode, a call mode, a record mode, a voice recognition mode, a broadcast reception mode, and the like. Also, the audio output unit 272 may output an audio signal related to a function performed in the electronic device 200 (e.g., a call signal reception sound, a message reception sound, etc.). The audio output unit 272 may include a receiver, a speaker, or a buzzer.

The memory unit 280 may store a program for operating the controller 290 and temporarily store input/output data.

For example, in order to access an electronic device having a hotspot function, the memory unit 280 may store connection-dedicated software. The memory unit 280 may store data regarding various patterns of vibrations and sound output when a touch is applied to the touch screen.

The memory 280 may include at least one type of storage medium including a flash memory type, a hard disk type, a multimedia card micro type, a card-type memory (e.g., SD or DX memory, etc), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. Also, the electronic device 200 may be operated in relation to a web storage device that performs the storage function of the memory unit 280 over the Internet.

The controller 290 typically controls general operations of the electronic device. For example, the controller 290 may serve to search for an electronic device having a hotspot function therearound, generate the identification information using the connection-dedicated software, and transmit the identification information to the electronic device to access the electronic device.

The controller 290 may perform a pattern recognition processing to recognize a handwriting input or a picture drawing input performed on the touch screen as characters or images, respectively.

The power supply unit 260 receives external power or internal power and supplies appropriate power required for operating respective elements and components under the control of the controller 290.

FIG. 3 is a block diagram illustrating a function of the controller 290 of an electronic device performing an access method to which the present invention is applied.

The controller 290 serves to control general operations of the electronic device 200.

In the method in which the electronic device 200 accesses an electronic device having a hotspot function, the controller 290 may search for electronic devices having a hotspot function therearound and select an electronic device intended to access from among the searched electronic devices. Also, the controller 290 may generate and transmit identification information to the selected electronic device to access the selected electronic device.

Referring to a specific internal configuration of the controller 290, an electronic device searching unit 291 may search for electronic devices having a hotspot function nearby on the basis of signals received from the electronic devices having a hotspot function nearby through the receiver 211.

An electronic device selecting unit 292 may receive an input signal for selecting an electronic device to be accessed from among searched electronic devices from the user input unit 230 or the display unit 271 and select the electronic device to be accessed.

An identification information generating unit 293 may generate identification information on the basis of the user input unit 230 or the display unit 271 or generate identification information by the connection-dedicated software in response to a request for identification information from the selected electronic device.

An identification information encrypting unit 294 may encrypt the identification information received from the identification information generating unit 293 such that it may not be exposed to the outside, and transmit the encrypted identification information to the selected electronic device.

When an access permission signal is received by the receiver 211 from the electronic device, an access processing unit 275 may access the selected electronic device.

FIG. 4 illustrates a user interface for explaining a method for accessing an electronic device having a hotspot function as the first embodiment to which the present invention is applied.

Referring to FIG. 4, in a method for accessing an electronic device having a hotspot function, electronic devices having a hotspot function may be searched, and one of the searched electronic devices selected to access (400).

In detail, an access device 410 may search for an electronic device 410 having a hotspot function and display the searched electronic device on a display unit of the access device 410.

The access device 410 may receive an input signal for selecting an electronic device to be accessed from among the searched electronic devices through the display unit or the user input unit, and select an electronic device to be accessed.

In order to access the selected electronic device, the access device 410 may receive an encryption key previously set in the selected electronic device through the display unit or the user input unit, and when the encryption key is proper, the access device 410 may access the selected electronic device.

FIG. 5 is a flow chart illustrating a method for accessing an electronic device having a hotspot function as the first embodiment to which the present invention is applied.

Referring to FIG. 5, in a method for accessing an electronic device having a hotspot function, the access device receives a beacon signal from the electronic device having a hotspot function (S500). Here, the beacon signal refers to a broadcast frame for an AP as a wireless sharer to periodically inform a shared channel about the presence of a network (BSS0 administered by the AP. In detail, the beacon signal refers to a broadcast frame periodically transmitted to inform a nearby electronic device about the presence of a wireless network so that the electronic device to search for the wireless network to participate in the wireless network.

The access device may search for the electronic devices having a hotspot function on the basis of the received beacon signals (S510), receive an input signal for selecting an electronic device to be accessed among the searched electronic devices, and select an electronic device to be accessed (S520).

When a signal requesting an encryption key is received from the selected electronic device, the access device may receive a signal regarding an encryption key previously set in the selected electronic device from the user input unit or the display unit and transmit the received signal to the selected electronic device (S530).

The access device receives a response signal regarding whether an access thereof is permitted according to whether the transmitted encryption key matches the preset encryption key from the selected electronic device (S540).

When the transmitted encryption key does not match the encryption key previously set in the selected electronic device, the access device may receive a response signal not permitting an access thereof from the selected electronic device, and the access device may be returned to step (S520) for selecting an electronic device to be accessed, and select a different electronic device to be accessed from among the searched electronic devices.

When the transmitted encryption key matches the encryption key previously set in the selected electronic device, the access device may receive a response signal permitting an access from the selected electronic device, and the access device may access the selected electronic device (S550).

When the access device accesses the selected electronic device, the access device may access the Internet through the hotspot function of the selected electronic device.

FIG. 6 illustrates a user interface for explaining a method for accessing an electronic device having a hotspot function to which the second embodiment is applied.

Referring to the second embodiment of the present invention with reference to FIG. 6, in a method for accessing an electronic device having a hotspot function, electronic devices having a hotspot function nearby are searched, and an electronic device to be accessed may be selected from among the searched electronic devices and accessed (600).

In detail, an access device 610 may search for electronic devices having a hotspot function nearby, and display the searched electronic devices.

The access device 610 may receive an input signal selecting an electronic device to be access from among the searched electronic devices through a display module or a user input unit, and select the electronic device to be accessed.

In order to access the selected electronic device 620, the access device 610 may receive a signal regarding an access key for requesting an access to the selected electronic device through the display unit or the user input unit. Here, the access key refers to identification information verifying that the access device may access the selected electronic device, rather than an encryption key previously set in the selected electronic device 620.

Such identification information is merely information regarding the access device 610 provided to the selected electronic device, which is not previously set in the selected electronic device.

Thus, even the access device accesses again an electronic device that the access device has previously accessed, the access device may be permitted for an access by inputting the same identification information or may be permitted for an access by transmitting new identification information.

When a response signal permitting an access is received from the selected electronic device on the basis of the transmitted identification information, the access device may access the selected electronic device.

FIG. 7 is a flow chart illustrating a process of accessing an electronic device having a hotspot function to which the second embodiment is applied.

Referring to FIG. 7, the access device may receive a Wi-Fi protected access (WPA) beacon signal from a transceiver unit of an electronic device having a hotspot function and search for the electronic device (S700). Here, WPA is the latest secure standard developed for Wi-Fi WLAN users, an improved version of wired equivalent privacy (WEP). The WPA provides a perfect user authentication function, as well as providing data encryption more sophisticated than WEP.

The access device may receive an input signal selecting an electronic device to be accessed from among the searched electronic devices through the display unit or the user input unit (S710).

When the access device transmits an access permission request signal to the selected electronic device (S720), the selected electronic device may request identification information verifying the access device (S740). Here, the identification information is generated by a specific input signal, and the specific input signal is an input signal received from the user through the display unit or the user input unit (for example, a touch signal through a touch sensor of the display unit or an input through a keyboard or a keypad as the user input unit). Also, the identification information may be generated through the connection-dedicated software (S750).

The identification information may include a character, a number, a symbol, an image, or combinations thereof, and may be randomly generated by the user of the access device or through the connection-dedicated software. Also, such identification information may be variable, and thus, it may be changed each time the access device accesses the selected electronic device.

A specific example of the identification information will be described with reference to FIG. 6. In FIG. 6, in order to access the selected electronic device, the access device 610 transmits an access key. In FIG. 6, identification information such as "It's me, bob, please OK!" is transmitted. Such identification information may be a specific sentence like the identification information of FIG. 6, or may be a specific image, a specific symbol, a specific number, or combinations thereof.

The selected electronic device may determine whether to allow an access of the electronic device through a signal regarding whether to permit an access input by a user of the electronic device on the basis of the identification information (S770).

In a case in which a response signal not permitting an access is received from the selected electronic device, the access device may be returned to step (S710) of selecting a device to be accessed, and select a different electronic device to be accessed from among the searched electronic devices.

In a case in which a response signal permitting an access is received from the selected electronic device, the access device may access the selected electronic device and the identification information may be stored in the selected electronic device (S790).

Step (S740) of requesting the identification information to step (S760) of transmitting the identification information may connected to an encryption channel and performed, and such an encryption channel is connected before step (S740) of requesting the identification information. The access device may encrypt the identification information through the encryption channel such that the identification information is not exposed to the outside, and transmit the encrypted identification information to the selected electronic device. The selected electronic device may decrypt the received encrypted identification information and display the decrypted identification information on a screen.

Step (S730) of connecting the encryption channel to step (S780) of permitting the connection may be authenticated by an extensible authentication protocol (EAP), an authentication protocol for extensibility. When the EAP is used, a remote access connection is authenticated by a certain authentication mechanism, which includes an authentication information request of an authenticator and a response from a remote access client. The EAP may properly perform authentication only when both the remote access client and the authenticator support the same type of EAP.

FIG. 8 is a flow chart illustrating a method for accessing an electronic device having a hotspot function performed by an access device to which the second embodiment is applied.

Referring to FIG. 8, the access device may receive beacon signals from electronic devices having a hotspot function (S800). The access device may search for electronic devices on the basis of the beacon signals (S810), and may receive an input signal selecting an electronic device to be accessed from among the searched electronic devices through the display unit or the user input and select an electronic device to be accessed (S820).

When requesting an access to the selected electronic device, the access device may receive a signal regarding identification information verifying the access device through the display device or the user input unit or from the connection-dedicated software and transmit the received signal to the selected electronic device (S830) to access the selected electronic device (S840).

FIG. 9 is a flow chart specifically illustrating an access method according to whether identification information transmitted from an access device is previously stored identification information, in a method for accessing an electronic device having a hotspot function to which the second embodiment is applied.

Referring to FIG. 9, after searching for the electronic devices having a hotspot function (S810), the access device may receive an input signal selecting an electronic device to be access from among the searched electronic devices, and select an electronic device to be accessed (S900).

In order to access the selected electronic device, the access device may receive a signal regarding identification information verifying the access device through the display unit or the user input unit or generate the identification information through connection-dedicated software and transmit the signal or the identification information to the selected electronic device (S910).

In this case, whether the access device is an access device which has been previously allowed for an access according to whether the transmitted identification information is identification information stored in the selected electronic device (S920).

In a case in which the identification information is identification information stored in the selected electronic device, it means that the access device is an access device which has been previously allowed for an access, and thus, the access device may receive a response signal permitting an access from the selected electronic device and access the selected electronic device (S940).

In a case in which the identification information is identification information not stored in the selected electronic device, it means that the access device is not an access device which has been previously allowed for an access, and thus, the access device receives a response signal regarding whether an access is permitted from the selected electronic device (S930).

In a case in which the response signal is a response signal not permitting an access, the access device is returned to step S900 of selecting an electronic device to be accessed, and select a different electronic device to be accessed from among the searched electronic devices.

In a case in which the response signal is a response signal permitting an access, the access device may access the selected electronic device (S940).

When the access device is allowed to access the selected electronic device, the access device may access the selected electronic device and access the wireless Internet through the hotspot function of the selected electronic device to transmit and receive data.

An example of application of the second embodiment of the present invention is a method for verifying an access device as a device allowed for an access by obtaining information regarding a specific function from an electronic device having a hotspot function and performing the same function as the specific function.

The electronic device obtains information regarding a function that may be performed by the electronic device from the access device, and when the obtained information is information regarding the same function as the specific function performed by the electronic device, the electronic device permits an access In a specific embodiment, when the access device requests an access to the electronic device having a hotspot function, LED lighting of the electronic device flickers.

When the LED lighting flickers, a camera of the access device may allowed to face the LED lighting to measure the number and frequency of flickering of the LED lighting. The access device may code the information (the number and frequency of flickering of the LED lighting) obtained from the LED lighting and transmit the coded information to the electronic device.

The electronic device may analyze the code received from the access device, and when the code is the same as features of a function performed by the LED lighting, the electronic device permits connection and the access device may access the electronic device.

Flickering of the LED lighting may be one of functions of the electronic device and it may be replaced with other functions. For example, an audio signal may be generated through a speaker, and in this case, the access device may receive the audio signal from a microphone. In addition, vibration of the electronic device or brightness of the screen or a change in an image may be such an example.

The embodiments described above may be variously modified and changed by those skilled in the art to which the present invention pertains without departing from the scope of the technical concept of the present invention, and thus are not limited to the aforementioned embodiments and accompanying drawings.

INDUSTRIAL APPLICABILITY

The present disclosure provides a method and apparatus for effectively accessing an electronic device having a hotspot function in a wireless communication system.

The invention claimed is:
1. A method for controlling a first device to access a device that performs a hotspot function, the method comprising:
    receiving a beacon signal from adjacent devices; searching for at least one device performing the hotspot function among the adjacent devices based on the beacon signal;
    selecting a specific device from among the at least one device;
    establishing an encryption channel with the specific device to transmit and receive messages related to access to the specific device;
    obtaining function information related to a first specific function of the specific device from the specific device;
    generating a code based on the function information;
    transmitting the code to the specific device;
    receiving a response signal, from the specific device, regarding whether access to the specific device is permitted based on the code; and
    accessing a wireless communication network using the hot spot function of the specific device,
    wherein the code is information for determining whether the first device is allowed to access the specific device,
    wherein the function information indicates a second specific function of the specific device recognized by the first device, and
    wherein the code is encrypted and transmitted over the encryption channel.

2. The method of claim 1, wherein when the first specific function and the second specific function are identical, the response signal indicates permission of an access.

3. The method of claim 1, further comprising:
  when the response signal indicates that an access is not permitted, receiving an input signal for selecting a different device to be accessed from among the at least one device; and
  performing an access procedure for accessing the different device.

4. The method of claim 1, wherein when the first device is a device which has been previously accessed, the code does not need to be the same as a previously used code.

5. The method of claim 1, wherein the specific function is one of a flickering of an LED light, an output of a sound signal, a vibration, a change in screen brightness or a change in an image.

6. A first device for accessing a device that performs a hot spot function, the first device comprising:
  a communication unit configured to:
    receive a beacon from adjacent devices,
    transmit identification information to a specific device, and
    receive a response signal regarding whether an access is permitted from the specific device based on the identification information;
  a display unit configured to:
    display at least one device performing the hotspot function among the adjacent devices; and
  a controller functionally connected to the communication unit and the display unit, and configured to:
    search for the at least one device performing the hotspot function among the adjacent devices based on the received beacon signal,
    select the specific device from among the at least one device,
    establish an encryption channel with the specific device to transmit and receive messages related to access to the specific device,
    obtain function information related to a first specific function of the specific device from the specific device,
    generate a code based on the function information,
    transmit the code to the specific device,
    receive a response signal regarding whether an access is permitted from the specific device based on the code, and
    access a wireless communication network using the hot spot function of the specific device,
  wherein the code is information for determining whether the first device is allowed to access the specific device,
  wherein the function information indicates a second specific function of the specific device recognized by the first device, and
  wherein the code is encrypted and transmitted over the encryption channel.

7. The first device of claim 6, further comprising:
an input unit configured to obtain the function information.

8. The first device of claim 6, further comprising:
a memory unit configured to store connection-dedicated software.

* * * * *